United States Patent
Young et al.

(10) Patent No.: US 7,138,907 B2
(45) Date of Patent: Nov. 21, 2006

(54) SPRING SENSOR RETENTION ASSEMBLY FOR SENSOR APPARATUS MOUNTED IN A VEHICLE SEAT CUSHION

(75) Inventors: Oliver J. Young, Grosse Pointe, MI (US); John F. Nathan, White Lake Twp., MI (US); Christopher Ricard, Rochester, MI (US)

(73) Assignee: Lear Corporation, Southfield, MI (US)

( * ) Notice: Subject to any disclaimer, the term of this patent is extended or adjusted under 35 U.S.C. 154(b) by 61 days.

(21) Appl. No.: 10/607,508

(22) Filed: Jun. 26, 2003

(65) Prior Publication Data

US 2004/0262957 A1    Dec. 30, 2004

(51) Int. Cl.
*B60R 25/10* (2006.01)
(52) U.S. Cl. ............... 340/426.1; 340/561; 324/207.11
(58) Field of Classification Search ............ 340/426.1, 340/573.1, 561, 438, 426.24, 425.5; 324/207.11–207.26; 280/735
See application file for complete search history.

(56) References Cited

U.S. PATENT DOCUMENTS

| | | | |
|---|---|---|---|
| 4,378,396 A | 3/1983 | Urai et al. | 428/198 |
| 4,403,356 A | 9/1983 | Urai | 5/481 |
| 4,722,760 A | 2/1988 | Shimada | 156/214 |
| 4,795,517 A | 1/1989 | Elliott et al. | 156/221 |
| 4,797,962 A | 1/1989 | Goode | 5/453 |
| 4,995,926 A | 2/1991 | Urai | 156/78 |
| 5,000,805 A | 3/1991 | Lowe | 186/90 |
| 5,068,504 A | 11/1991 | Rogers | 200/85 R |
| 5,157,372 A | 10/1992 | Langford | 338/211 |
| 5,260,684 A | 11/1993 | Metzmaker | 340/457.1 |
| 5,309,135 A | 5/1994 | Langford | 338/211 |
| 5,372,668 A | 12/1994 | Bracesco | 156/214 |
| 5,413,378 A | 5/1995 | Steffens, Jr. et al. | 280/735 |
| 5,454,591 A | 10/1995 | Mazur et al. | 280/735 |
| 5,474,327 A | 12/1995 | Schousek | 280/735 |
| 5,515,933 A | 5/1996 | Meyer et al. | 180/273 |
| 5,570,903 A * | 11/1996 | Meister et al. | 280/735 |
| 5,573,269 A | 11/1996 | Gentry et al. | 280/735 |
| 5,592,705 A | 1/1997 | West | 5/424 |
| 5,602,425 A | 2/1997 | Wilhelmi et al. | 307/10.1 |
| 5,605,348 A | 2/1997 | Blackburn et al. | 280/735 |
| 5,612,876 A | 3/1997 | Zeidler et al. | 364/424.055 |
| 5,615,917 A | 4/1997 | Bauer | 280/806 |
| 5,739,757 A | 4/1998 | Gioutsos | 340/667 |
| 5,984,349 A | 11/1999 | Van Voorhies | 280/735 |
| 6,012,007 A | 1/2000 | Fortune et al. | 701/45 |
| 6,283,504 B1 | 9/2001 | Stanley et al. | 280/735 |
| 6,348,862 B1 | 2/2002 | McDonnell et al. | 340/562 |
| 6,367,837 B1 * | 4/2002 | Hamada et al. | 280/735 |

(Continued)

FOREIGN PATENT DOCUMENTS

DE    42 37 072    12/1993

(Continued)

*Primary Examiner*—Phung T. Nguyen
(74) *Attorney, Agent, or Firm*—MacMillan, Sobanski & Todd, LLC

(57) ABSTRACT

A sensor assembly for use in a vehicle seat cushion for detecting the presence of an occupant includes a mat adapted to be installed in the vehicle cushion. The mat includes first mounting structure and a first sensor device attached to the mat. A first member has a second mounting structure adapted to be attached to the first mounting structure for attaching the first member to the mat. A second member is movably mounted relative to the first member about an axis. A second sensor device is mounted in the second member.

20 Claims, 4 Drawing Sheets

U.S. PATENT DOCUMENTS

| | | | |
|---|---|---|---|
| 6,392,542 B1 | 5/2002 | Stanley | 340/561 |
| 6,394,490 B1 | 5/2002 | Osmer et al. | 280/735 |
| 6,476,514 B1 | 11/2002 | Schondorf | 307/10.1 |
| 6,629,445 B1 * | 10/2003 | Yamanaka et al. | 73/1.13 |
| 6,816,077 B1 * | 11/2004 | Shieh et al. | 340/602 |
| 6,891,111 B1 * | 5/2005 | Morell et al. | 177/144 |
| 2001/0045733 A1 | 11/2001 | Stanley et al. | 280/735 |
| 2002/0027348 A1 * | 3/2002 | Speckhart et al. | 280/735 |
| 2002/0059022 A1 | 5/2002 | Breed et al. | 701/45 |
| 2002/0063465 A1 | 5/2002 | Pinkos | 297/452.58 |
| 2003/0009273 A1 | 1/2003 | Stanley et al. | 701/45 |
| 2003/0169033 A1 | 9/2003 | Tromblee et al. | 324/207.2 |
| 2003/0220766 A1 | 11/2003 | Saunders et al. | |
| 2004/0174004 A1 * | 9/2004 | Smith et al. | 280/735 |

FOREIGN PATENT DOCUMENTS

| | | |
|---|---|---|
| EP | 0 900 705 | 3/1999 |
| JP | 98/30413 | 7/1998 |
| JP | 10214537 | 8/1998 |
| JP | 11297153 | 10/1999 |
| JP | 11310071 | 11/1999 |
| JP | 2000-306462 | 11/2000 |
| JP | 2000-311565 | 11/2000 |
| JP | 2000-357431 | 12/2000 |

* cited by examiner

SPRING SENSOR RETENTION ASSEMBLY FOR SENSOR APPARATUS MOUNTED IN A VEHICLE SEAT CUSHION

BACKGROUND OF THE INVENTION

This invention relates in general to a vehicular seat assembly having a flexible air bag suppression sensor apparatus. More specifically, this invention relates to a spring sensor assembly of the sensor apparatus.

Vehicular air bags play an important role in restraining a seat occupant in vehicular crash situations. However, air bags designed for adequately restraining a large sized occupant may not provide optimal restraint protection for a smaller sized occupant or for a child occupying a child seat. In addition, the deployment of an air bag corresponding to an unoccupied seat represents an unnecessary repair expense.

Sensor apparatuses have been proposed for detecting whether or not a given seat is occupied. These types of sensor apparatuses act as on/off switches in controlling the deployment of a corresponding air bag. However, these types of sensor apparatuses simply address the need for preventing the deployment an air bag when the seat is unoccupied.

Other sensor apparatuses have been proposed to detect the placement of an occupant in a given seat for the purpose of suppressing the deployment of a corresponding air bag. Specifically, these types of sensor apparatuses detect whether or not the front and/or rear portions of a given seat are occupied. In situations in which only the front or only the rear portion of the seat is occupied, a sensor apparatus provides a signal for controlling the degree in which the air bag is to be suppressed during deployment. However, these sensor apparatuses do not provide a means for suppressing the air bag when both the front and rear portions of the seat are occupied.

Other sensor apparatuses have been proposed which determine the weight of an occupant based on detected variations in seat occupancy loading for providing a means of controlling the degree in which a respective air bag is to be suppressed during deployment. However, these types of sensor apparatuses require that a sensor apparatus be directly mounted to the structure of a given seat and that the sensor apparatus itself be structural. Consequently, these sensor apparatuses are relatively massive. Additionally, these sensor apparatuses are typically sensitive to physical and environmental changes that affect the repeatability of the performance of the sensor apparatus.

Other sensor apparatuses include a flexible sensor apparatus mounted to a seating face of a seat cushion. The flexible sensor apparatus includes a plurality of sensors imbedded at various locations of the vehicle seat cushion. These sensors, along with a microprocessor and an appropriate algorithm, are generally capable of detecting both the size of a passenger and the presence of an occupied child seat for the purpose of controlling the degree in which a corresponding air bag is to be suppressed during deployment. The flexible sensor apparatus offers improved reliability, as well as the advantages of being nonstructural and compact. However, the individual sensors are commonly affected by shear forces within the seat cushion, which may lead to false signals. The plurality of sensors are also difficult to install properly onto the sensor apparatus.

BRIEF SUMMARY OF THE INVENTION

This invention relates to a sensor assembly for use in vehicle seat cushions for detecting the presence of an occupant. The sensor assembly includes a mat adapted to be installed in the vehicle cushion. The mat includes first mounting structure and a first sensor device attached to the mat. A first member has a second mounting structure adapted to be attached to the first mounting structure for attaching the first member to the mat. A second member is movably mounted relative to the first member about an axis. A second sensor device is mounted in the second member.

Various objects and advantages of this invention will become apparent to those skilled in the art from the following detailed description of the preferred embodiment, when read in light of the accompanying drawings.

DETAILED DESCRIPTION OF THE INVENTION

Figure 1:
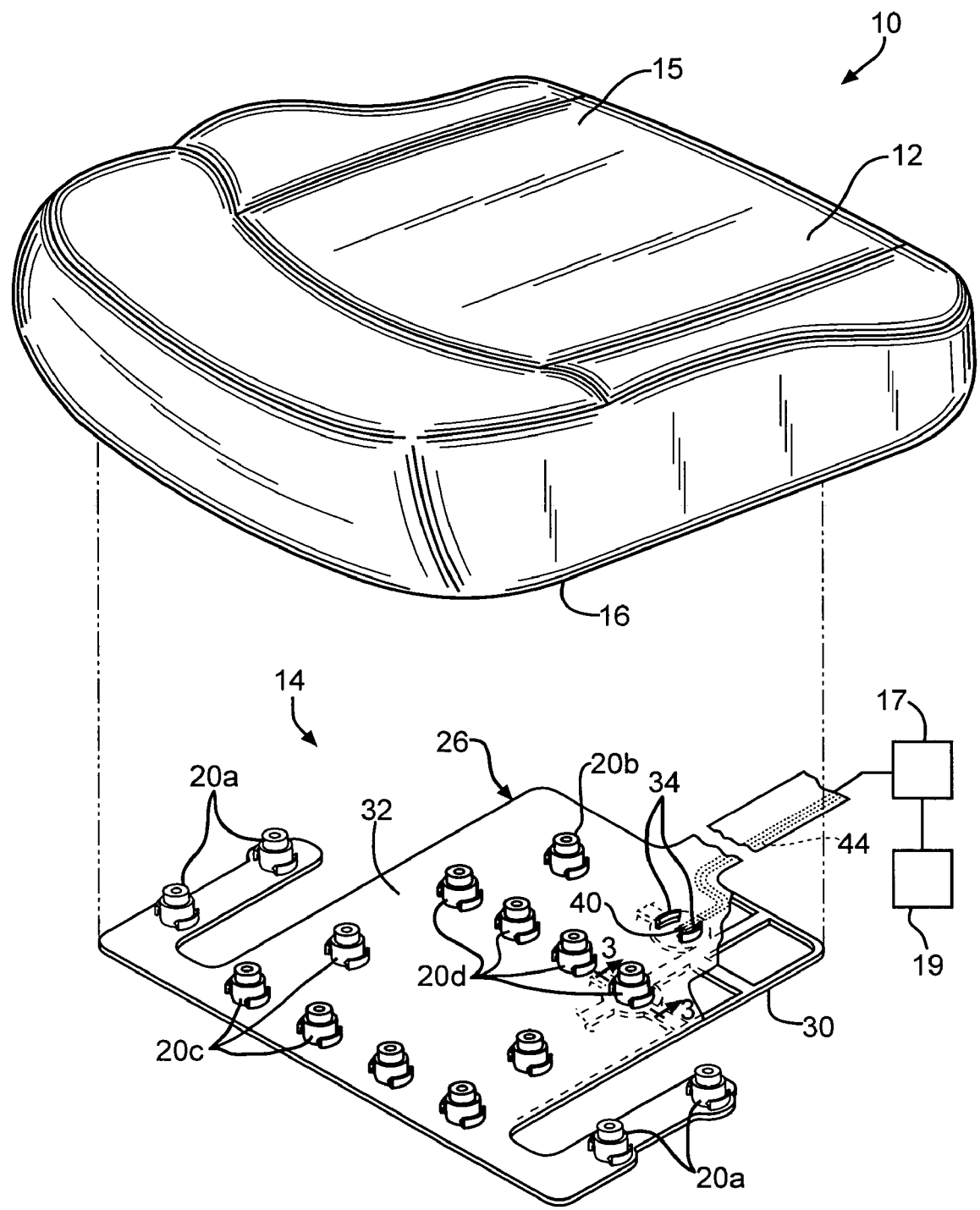
FIG. 1 is an exploded perspective view of a vehicle seat cushion assembly including a flexible sensor mat attached to a seat cushion, wherein the flexible mat includes a plurality of sensor assemblies in accordance with the present invention.

Referring now to the drawings, there is illustrated in FIG. 1 a seat cushion assembly indicated generally at 10. The assembly 10 includes a seat cushion 12 and a sensor mat assembly 14 mounted in the cushion 12. The seat cushion 12 can have any desired contoured shape and is adapted to be mounted on a vehicle seat frame (not shown). As will be explained in detail below, the mat 14 includes a plurality of sensor assemblies 20 (20a, 20b, 20c, and 20d) which detect the presence of an occupant seated on the seat. The sensor assemblies 20 include movably mounted members which detect displacement therebetween caused by the weight of occupant seated on the cushion 12. The sensor assemblies 20 are electrically connected to a controller 17, such as a microprocessor. The controller 17 receives sensor input from the sensor assemblies relating to the weight of the occupant caused by the force transmitted through the cushion 12. Since the mat assembly 14 preferably includes a plurality of sensor assemblies 20, the sensor input may also determine the position of an occupant relative to the cushion 12, for example, whether the occupant is seated far forward in the seat. The sensor input may also be used to determine whether a person or an object is seated on the cushion 12. Based on the reading from the sensor assemblies, the controller 17 controls the operation of a device 19 mounted in the vehicle. The device 19 can be any device which is actuated based on the readings from the sensor assemblies 20. An example of a device 19 is an air bag module. In this case, the controller 17 determines from the sensor input whether or not to actuate the air bag or to control the deployment force of the air bag. For example, if the sensor assemblies 20 detect the presence of a small adult or child, the controller 17 may stop deployment of the air bag during a detected vehicle impact condition or, alternatively, the controller 17 may actuate the air bag to deploy at a lower force than if a larger adult was detected.

The cushion 12 has an upper seating surface 15. The seat cushion 12 also includes a lower or downwardly facing surface 16. The seat cushion 12 can be formed of any suitable layers of material, such as a foam layer and an outer trim material, which permit the transfer of the force from an object resting on the cushion to be transferred to the sensor assemblies 20. Preferably, the cushion 12 includes grooves or indentations (not shown) formed in the lower surface 16 for receiving the sensor assemblies 20. Thus, the mat assembly 14 can be simply positioned on the lower surface 16 with the sensor assemblies 20 extending upwardly into recesses of the cushion 12. It should be understood that the sensor assemblies 20 can be positioned at any suitable position within the cushion 12 which enables forces from the weight of an occupant of the cushion assembly 10 acting on the upper surface of the cushion 12 to be transferred through the cushion and onto the sensor assembly 20. For example, the mat assembly 14 could be molded into the foam material of the cushion 12.

Preferably, the mat assembly 14 includes a mat 26 having a lattice type substrate 30 and a sheet or covering 32 mounted on and above the substrate 30. The substrate 30 defines a plurality of mounting locations for the mounting of each sensor assembly 20. The mounting locations are located at intersections of the lattice type substrate 30 and include integral mounting features formed therein, such as for example resilient mounting tabs 34. As will be explained in detail below, the tabs 34 mate with cooperating mounting features of the sensor assemblies 20 to attach the sensor assemblies 20 to the mat 26.

Figure 3:
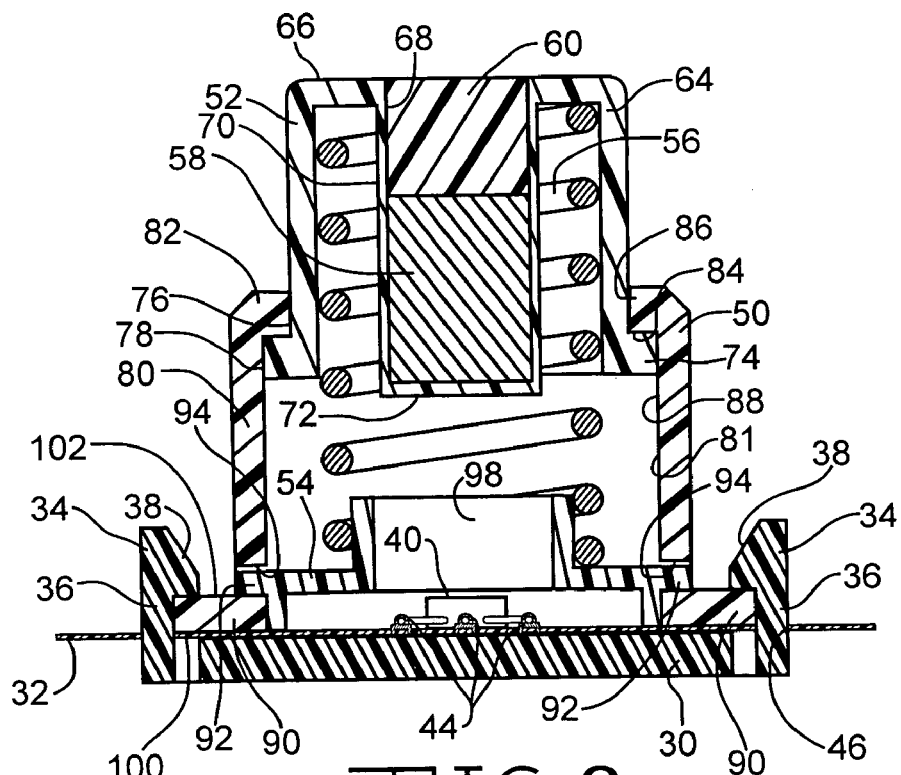
FIG. 3 is a cross-sectional view of a portion of the mat and the sensor assembly apparatus.

The substrate 30 can be made of any suitable material, such as plastic, to provide a generally rigid structure for mounting and positioning the sensor assemblies 20 relative to one another. As best shown in FIG. 3, the mounting tabs 34 of the substrate 30 include a generally vertical portion 36 and a hook portion 38, the reason for which will be explained in detail below. As shown in FIG. 1, each mounting location includes a pair of tabs 34 for receiving a sensor assembly 20. In the embodiment of the mat 26 illustrated in FIG. 1, there are sixteen mounting locations. For clarity purposes, one of the mounting locations is shown without a sensor assembly 20 attached thereto. The mounting locations can be formed at any suitable position relative to the other sensor assemblies 20 for providing desired sensor readings or input. For example, it has been found that a pair of sensor assemblies 20a mounted at each side of the cushion 12 provides adequate sensor input for detection of forces exerted on the side bolster portion of the cushion. The embodiment of the mat assembly 14 also includes a pair of rearwardly positioned sensor assemblies 20b (one not shown), six frontal sensor assemblies 20c, and four intermediate sensor assemblies 20d. Of course, any number of sensor assemblies 20 can be used and positioned at any location on the mat assembly 14.

The covering 32 can be formed of any suitable material, such as plastic, and may be attached to the substrate 30. The covering 32 provides for a convenient manner of mounting sensor devices 40, such as a hall effect sensors, relative to the substrate 30 at each mounting location. As will be explained in detail below, the sensor device 40 cooperates with another sensor device, such as a magnet, movably mounted in the sensor assembly 20 to provide sensor input relating to the displacement of a portion of the sensor assembly which relates to the force exerted on the sensor assembly 20. The covering 32 can also include electrical wiring 44 either attached thereto or embedded therein for electrically connecting the sensor device 40 to the controller 17. The covering 32 includes openings 46 formed therein to permit the tabs 34 of the substrate 30 to extend upwardly therethrough.

Figure 2:
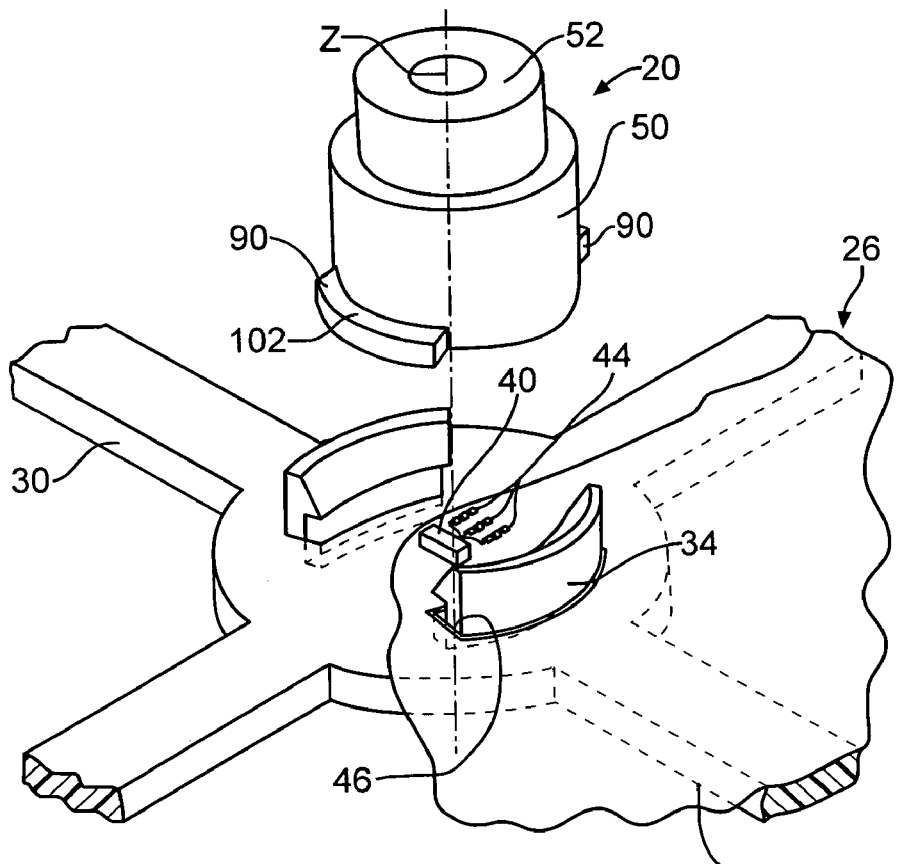
FIG. 2 is an exploded perspective view of a portion of the mat of FIG. 1 and a first embodiment of a sensor assembly.

Referring to FIGS. 2 and 3, the sensor assembly 20 includes a stepped generally cylindrical housing generally having three members: a main body 50, an upper cap 52, and a lower closure member 54. The cap 52 is telescopically slidably disposed in the body 50 about an axis Z, generally relating to a vertical axis. For reasons explained below, the sensor assembly 20 further includes a spring 56, a sensor device, such as a magnet 58, and an optional plug 60 all disposed within the interior of the housing.

The cap 52 includes an outer cylindrical wall 64 and a circular shaped upper surface 66. The upper surface 66 includes a central opening 68 formed therein. A generally tubular extension 70 extends downwardly from the upper surface 66 and is in communication with the opening 68. The tubular extension 70 can be closed off at the lower portion thereof by a circular wall 72. Alternatively, the circular wall 72 may include an opening formed therein. The cap 52 also includes a lip 74 at the lower portion thereof which extends radially outwardly from the cylindrical wall 64, the reason for which will be explained below. The cylindrical wall 64 defines a first cylindrical outer surface 76. The lip 74 defines a second cylindrical outer surface 78 having a diameter which is greater than the diameter of the first outer surface 76. The magnet 58 is disposed in the tubular extension 70. If desired, the sensor assembly 20 can include the plug 60 for closing off the opening 68 to help retain the magnet 58 in the tubular extension 70 of the cap 52.

The main body 50 includes an outer cylindrical wall 80 defining an inner bore 81. The body 50 also includes a flange 82 extending radially inwardly from the upper portion of the wall 80 to define a shoulder 84. The flange 82 defines a first inner cylindrical surface 86. The wall 80 defines a second inner cylindrical surface 88 having a diameter which is greater than the diameter of the first inner cylindrical surface 86.

As shown in FIG. 3, the closure member 54 closes off the bottom portion of the body 50. The closure member 54 can include outwardly extending ears 92 which are flexibly inserted into apertures 94 formed in the wall 80 of the body 50, thereby removably attaching the closure member 54 to the body 50. The closure member 54 also includes an upwardly extending cylindrical tubular extension 98.

Prior to attachment of the closure member 54, the spring 56 is inserted into the interior of the body 50 and the cap 52. The spring 56 biases the cap 52 upwardly relative to the body 50 such that the lip 74 engages with the shoulder 84. The spring 56 can be any suitable spring structure, such as a coil spring, which biases the cap 52 upwardly relative to the body 50. This positions the magnet at a predetermined distance from the hall effect sensor 40 when the sensor assembly 20 is mounted on the mat 26. A force acting upon the cap 52 slidably moves the cap 52 into the interior of the body 50 against the return force of the spring 56 such that the magnet 58 is at a different distance from the hall effect sensor 40. The hall effect sensor 40 detects the displaced position of the magnetic field generated by the magnet 58 relative to the sensor 40, thereby generating a sensor input signal to the controller 17 corresponding to weight or force acting on the upper surface 66 of the cap 52. The sensor input signal is transmitted via the wiring 44 from the hall effect sensor 40.

One of the advantages of the structure of the sensor assembly 20 is that the cap 52 generally remains in a vertical position along the axis Z during movement of the cap 52 relative to the body 50. It is undesirable to permit the cap 52 to tilt about the axis Z since this movement could effect the distance between the magnet 58 and the sensor 40, thereby emitting a false signal. This consistent vertical movement of the cap 52 relative to the body 50 is provided by the sliding arrangement of the surfaces 76, 78, 86, and 88. These pairs of mating surfaces help prevent the cap 52 from tilting relative to the body 50. There are often shear forces exerted on the sensor assembly 20 from the foam of the cushion 12. It is desirable for the sensor assembly 20 to not move the cap 52 relative to the body 50 when subjected to these shear forces to prevent false or misleading readings.

In the embodiment of the sensor assembly 20 of FIGS. 2 and 3, the body 50 further includes a pair of outwardly extending flanges 90 which mate with the tabs 34 to mount the sensor assembly 20 to the mat 26. As shown in FIG. 2, each flange is arcuate in shape about a generally vertical axis Z and extends around a portion of the circumference of the body 50. Preferably, each flange 90 extends about the body in an arcuate shape of less than 90 degrees to permit a "quarter turn" attachment in which the sensor assembly 20 is mounted on the mat 26 by being rotated approximately 90 degrees. The tabs 34 are also arcuate in shape about the axis Z.

To mount the sensor assembly 20 onto the mat 26, the sensor assembly 20 is first lowered from a position as shown in FIG. 2 until a bottom surface 100 rests on the covering 32. Note that the arcuate portions of the tabs 34 and the flanges 90 do not interfere with each other in a vertical direction when in this first orientation, as shown in FIG. 2. At this point, the upper surfaces 102 of the flanges 90 are at the same vertical height or lower than the hook portions 38 of the tabs 34. The body 50 of the sensor assembly 20 can then be rotated until the upper surface 102 of the flanges are disposed below the corresponding hook portions 38 and frictionally engaged therewith. Preferably, the body 50 is rotated approximately 90 degrees such that substantially all of the arcuate portions of the flanges are captured by the arcuate portions of the hook portions 38. If desired, a stop may be provided on either of the body 50 or the substrate 30 to prevent further rotation of the sensor assembly, thereby alerting the installer that the correct angular position has been obtained.

Alternatively, the flanges 90 can be captured underneath the hook portions 38 by a snap fit arrangement in which the body 50 is in the position shown in FIG. 2, and is then pressed downwardly over the tabs 34 such that the vertical portions 36 flex outwardly to permit the flange 90 to slide downwardly until the hook portion 38 snaps back into position, as shown in FIG. 3.

Preferably, the bottom surface 100 is circular and its perimeter edge is continuous, such that the bottom surface 100 is in contact with the covering 32 around its entire circumference. It is also preferably that the covering 32 be tightly held between the bottom surface 100 and the substrate 30. This maintains the covering in a taut position to substantially prevent movement of the sensor device 40. This provides a stress relief function in which forces acting on the covering 32 are less likely to move the sensor device 40 relative to the sensor assembly 20. It is desirable to maintain this tautness so that the sensor device 40 does not move relative to the other sensor device 58 given false readings. Preferably, the tautness is maintained by the other sensor assembly retention embodiments as disclosed herein.

Figure 4:
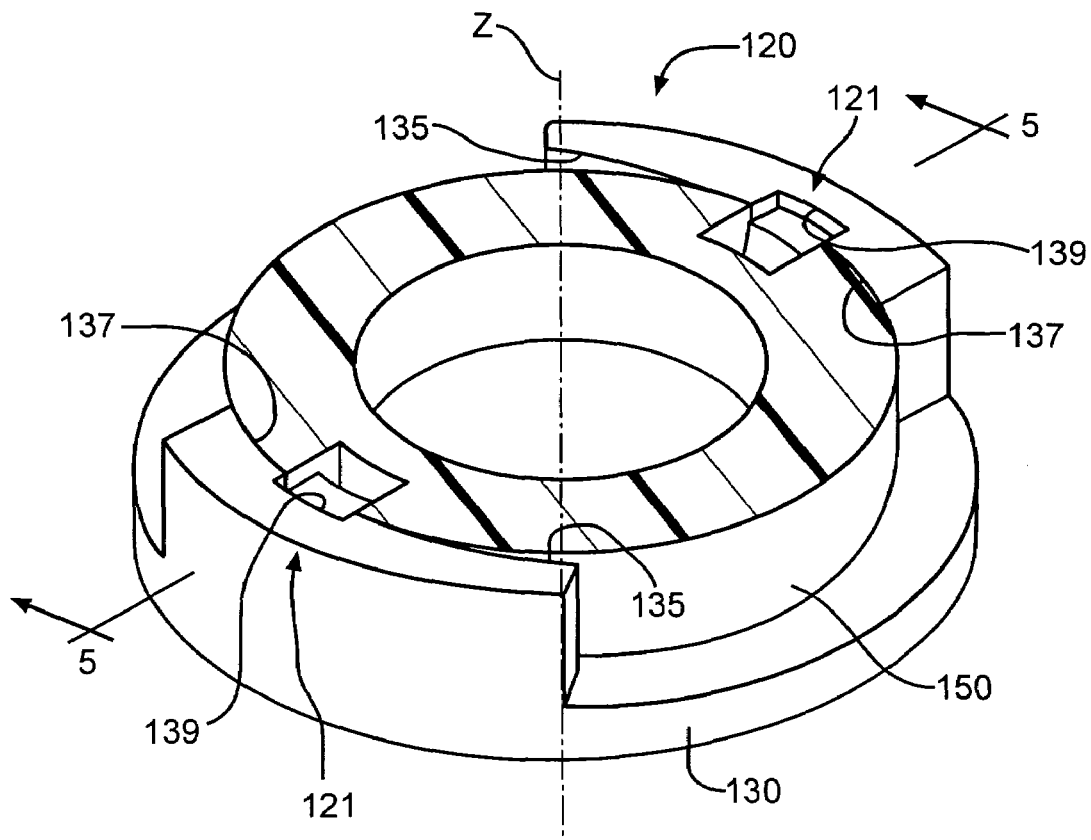
FIG. 4 is a partial cross-sectional view of lower portion of a second embodiment of a sensor assembly.
Figure 5:
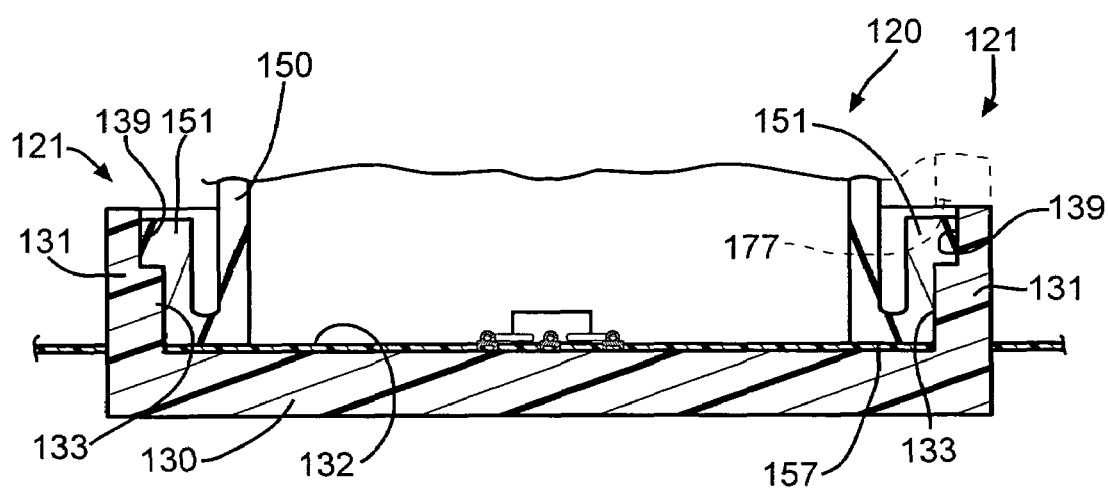
FIG. 5 is a partial sectional view of the sensor assembly of FIG. 4.

There is illustrated in FIGS. 4 and 5 a second embodiment of sensor assembly, indicated generally at 120. The assembly 120 is similar in structure and in function to the assembly 20 of FIGS. 1–3, as such, similar 100 series and 10 series numbers indicate similar features. Note that for clarity, only a lower portion of the sensor assembly 120 is shown in FIGS. 4 and 5. One of the primary differences between the assemblies 120 and 20 is that the assembly 120 includes a pair of stops, indicated generally at 121, to prevent further rotation of the sensor assembly 120, thereby alerting the installer that the correct angular position has been obtained.

The assembly 120 includes a body 150 having a generally cylindrical shape and further including a pair of resilient flanges 151 extending radially outwardly from the body 150. The flanges 151 are resilient in that the upper portion of the flanges 151 can be deflected to an inward position towards the axis Z. The substrate 130 includes a pair of upwardly extending tab portions 131 defining an inner surface 133. As best shown in FIG. 4, the inner surfaces 133 do not have a constant radius, but include sloped portions 135 which have a diameter larger than main portion 137 of the tab portions. A radially outwardly extending groove 139 is formed in each of the inner surfaces 133 for receiving the flanges 151 of the assembly 120, as shown in FIG. 4.

To mount the sensor assembly 120 onto the substrate 130, the assembly 130 is first placed in a position similar to the position of the sensor assembly 20 illustrated in FIG. 2 in which the flanges 151 are not aligned with the tab portions 131 such that a lower surface 157 of the body 151 can be placed directly on the covering 132 resting on the substrate 130. The body 150 is then rotated (clockwise as viewing FIG. 4) until the flanges 151 engage with the sloped portions 135. Further rotation will cause the flanges 151 to deflect radially inwardly sliding along the sloped portions 135 until the flanges 151 encounter the respective groove 139 and then snap back outwardly into position such that the flanges 151 are rotationally trapped within the grooves 139, thereby functioning as a stop and rotationally locking the assembly 120 relative to the substrate 130. Optionally, the substrate 130 can include an overhang portion, indicated generally by phantom lines 177, which also vertically traps the flanges 151, thereby preventing the assembly 120 from being pulled upwardly away from the substrate 130.

Figure 6:
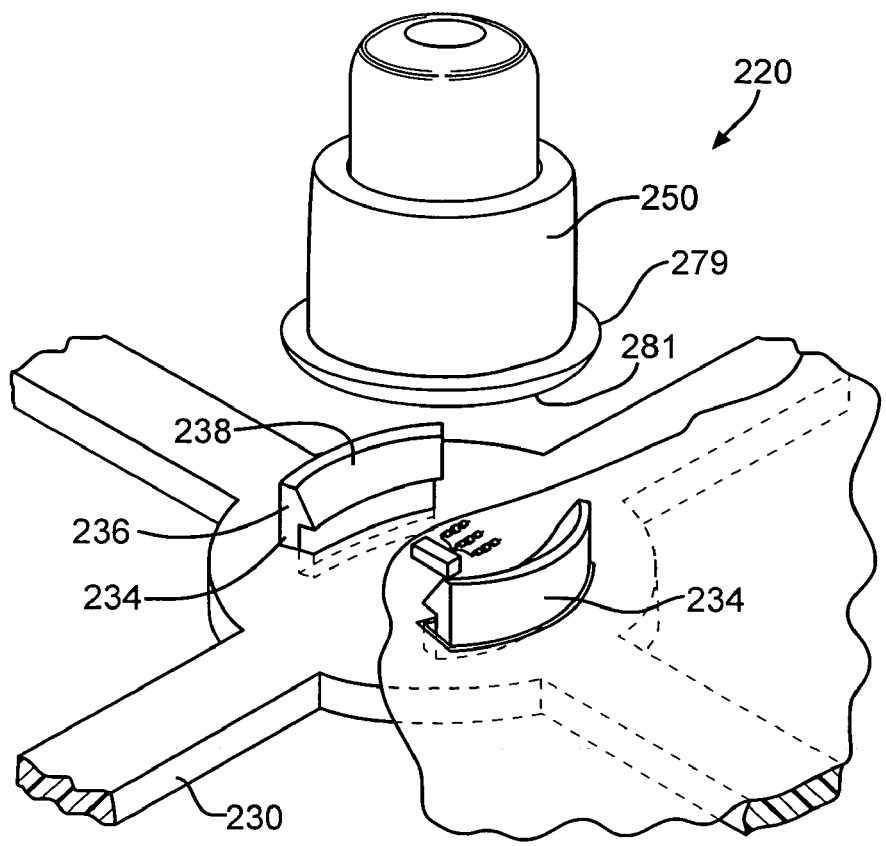
FIG. 6 is an exploded perspective view of a third embodiment of sensor assembly.
Figure 7:
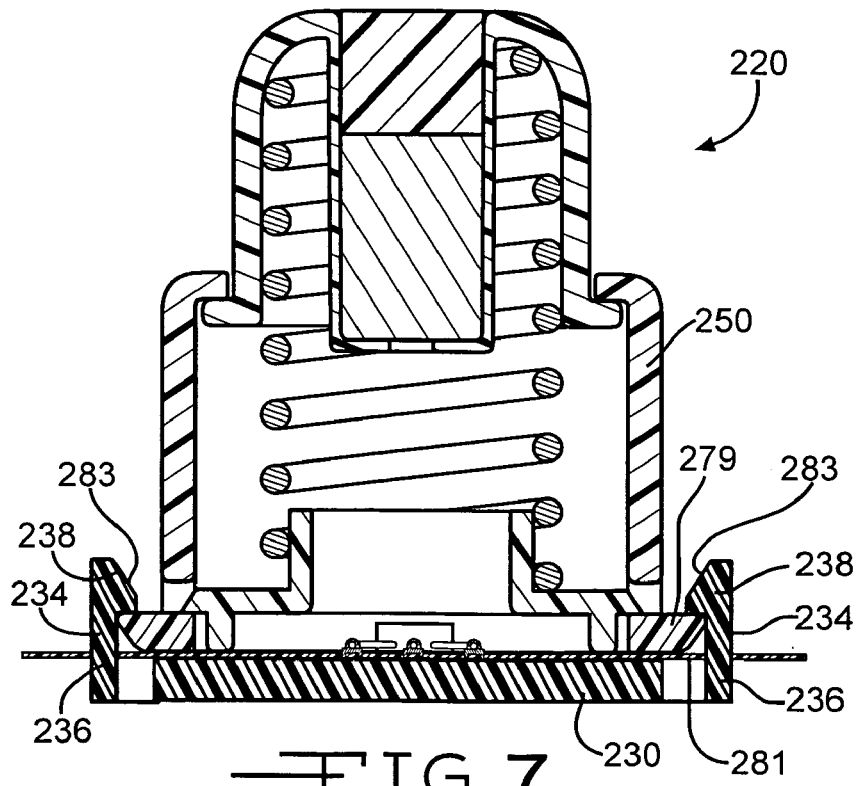
FIG. 7 is a cross-sectional view of the sensor assembly of FIG. 6.

There is illustrated in FIGS. 6 and 7 a third embodiment of a sensor assembly 220 attachable to a substrate 230 similar to the substrate 30 by a snap fit. The substrate 230 includes mounting tabs 234 having a generally vertical portion 236 and a hook portion 238. The hook portion 238 is resiliently attached to the substrate 230 such that the tab portions 234 can be flexed radially outwardly. The assembly 220 includes a body 250 having an annular flange 279 preferably extending substantially around the entire perimeter of the lower portion of the body 250. The flange 279 includes a ramped surface 281 which slidably engages the sloped portion 283 of the hook portions 238 during installation.

To install the sensor assembly 230, the body 250 is pressed down over the tabs 234 such that the tabs flex radially outwardly, until the upper surface 299 of the flange 279 is below the hook portion 238. At this position, the tabs 234 will flex back to their original shape thereby capturing the sensor assembly 230, as shown in FIG. 7. The arcuate shape of the tabs 234 corresponding to the cylindrical shape of the body 250 provides for a self-alignment of the sensor assembly 220 onto the substrate 230.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A sensor assembly for use in a vehicle seat cushion for detecting the presence of an occupant, said assembly comprising:
    a mat adapted to be installed in a vehicle cushion, said mat including a first mounting structure and a first sensor device attached to said mat;
    a first member having a second mounting structure adapted to be attached to said first mounting structure for attaching said first member to said mat;
    a second member movably mounted relative to said first member about an axis; and
    a second sensor device mounted in said second member, wherein one of said first and second mounting structures includes a tab engaging a portion of the other one of said first and second mounting structures to attach said first member to said mat.

2. The assembly of claim 1, wherein said mat includes a sheet having said first sensor device mounted thereon, and wherein said sheet is disposed between said first member and said mat such that said sheet is held taut to substantially prevent movement of said first sensor device in a direction along said axis.

3. The assembly of claim 1, wherein said second mounting structure attaches to said first mounting structure by a snap fit.

4. The assembly of claim 1, wherein said tab includes an arcuate portion formed about said axis, said arcuate portion engaging said second mounting structure.

5. The assembly of claim 4, wherein said second mounting structure includes an arcuate portion engaging said arcuate portion of said first mounting structure.

6. The assembly of claim 5, wherein said first member is cylindrical in shape, and wherein said arcuate portion of said second mounting structure extends substantially about the entire perimeter of said first member.

7. The assembly of claim 1, wherein said second mounting structure attaches to said first mounting structure by frictionally engaging surfaces of said first and second mounting structures.

8. The assembly of claim 1, wherein said first mounting structure includes a radially outwardly extending groove relative to said axis, and wherein said second mounting structure includes a radially outwardly extending flange which mates with said groove to attach said first member to said mat.

9. The assembly of claim 8, wherein said flange is slidably disposed in said groove.

10. The assembly of claim 9, wherein said flange is rotatably slidably disposed in said groove about said axis.

11. The assembly of claim 10, wherein one of said first and second mounting structures include a stop for preventing said first member from rotating relative to said mat.

12. The assembly of claim 8, wherein one of said first and second mounting structures includes a resilient tab engaging a portion of the other one of said first and second mounting structures to prevent rotational movement of said first member relative to said mat.

13. The assembly of claim 8, wherein said first mounting structure includes a pair of opposed outwardly extending grooves, and wherein said second mounting structure includes a pair of radially outwardly extending flanges which mate with respective grooves to attach said first member to said mat.

14. The assembly of claim 1, wherein said first member defines an opening, and wherein said second member has a portion slidably disposed in said opening such that said first member is movably mounted relative to said first member about an axis.

15. The assembly of claim 1 further including a spring biasing said first member relative to said second member.

16. The assembly of claim 1 wherein the first member and the second member are rigid.

17. The assembly of claim 16 wherein the second member is telescopically disposed in the first member.

18. The assembly of claim 1, wherein said first member defines an opening, and wherein said second member has a portion slidably disposed in said opening such that said first member is movably mounted relative to said first member about an axis, said assembly further including a spring biasing said first member relative to said second member, and wherein said spring is housed at least in part in said opening.

19. The assembly of claim 1, wherein said tab is formed on said mat and extends upwardly therefrom.

20. A sensor assembly for use in a vehicle seat cushion for detecting the presence of an occupant, said assembly comprising:
    a mat adapted to be installed in a vehicle cushion, said mat including a first mounting structure and a first sensor device attached to said mat;
    a first member having a second mounting structure adapted to be attached to said first mounting structure for attaching said first member to said mat;
    a second member movably mounted relative to said first member about an axis; and
    a second sensor device mounted in said second member, wherein said first mounting structure includes a radially outwardly extending groove relative to said axis, and wherein said second mounting structure includes a radially outwardly extending flange which mates with said groove to attach said first member to said mat.

* * * * *